Patented Jan. 12, 1926.

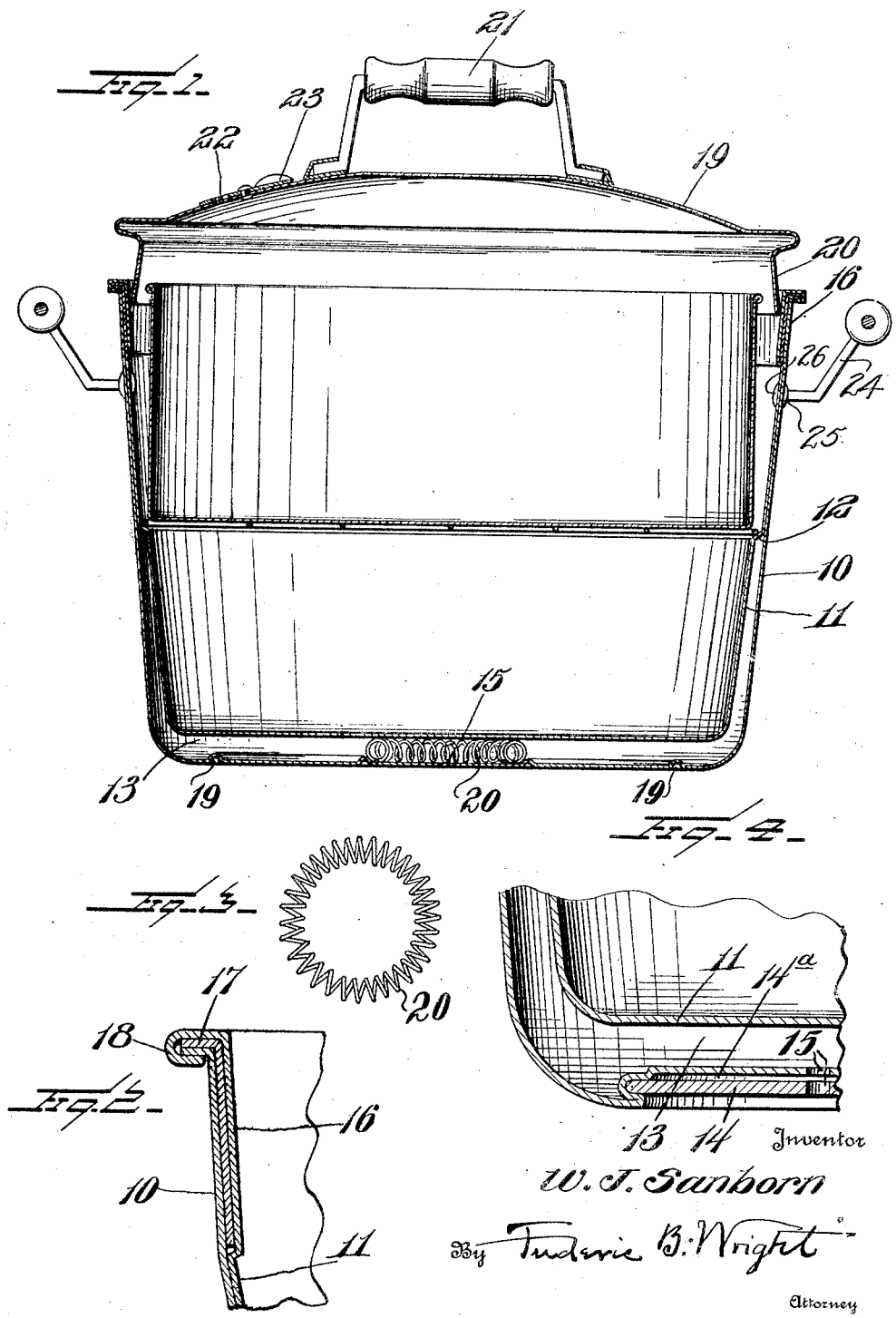

1,569,788

UNITED STATES PATENT OFFICE.

WILLIAM J. SANBORN, OF CLEVELAND, OHIO.

CULINARY UTENSIL.

Application filed August 30, 1924. Serial No. 735,160.

*To all whom it may concern:*

Be it known that I, WILLIAM J. SANBORN, a citizen of the United States, residing at Cleveland, in the county of Cuyahoga and State of Ohio, have invented certain new and useful Improvements in Culinary Utensils, of which the following is a specification.

This invention relates to vessels such as culinary vessels, and particularly to vessels having inner and outer shells defining a space between the shells.

In the pending application of George R. Fassett, Serial #661,864, filed September 10, 1923, there is disclosed a vessel having an air space between the inner and outer shells, the space extending across the bottom of the vessel and up the sides to the rim thereof and having a vent in the outside wall adjacent the rim to permit expansion of the air between the inner and outer shells.

Vessels so constructed have proved themselves particularly efficient for cooking and serving foods requiring but a relatively small amount of heat for cooking and maintaining food either hot or cold because of the insulating jacket, and the object of the present invention is to improve upon the general structure and details of said vessels in the following respects:

1st. The outer shell is spaced from the inner shell for a height approximately half that of the vessel and from this point extends upward to the rim in approximate contact with the inner shell. I have found by tests and experiments that such a construction secures the much more rapid heating and cooking of the food and that it permits the easier and stronger attachment of the handles to the vessel.

2nd. The placing of the vent in the bottom of the vessel, preferably at the middle thereof, prevents the air between the shells escaping as it heats up with a constant introduction of cool air, but on the contrary prevents the escape of hot air except at the point of highest heat. This, I have also found, is a great aid in rapid heating up of the vessel and its contents.

3rd. The formation of the upper portion of the vessel with an outwardly flaring inner face and the provision of a cover with an outwardly and downwardly flaring resilient flange which secures a much better closing engagement with the vessel without jamming the cover on tightly against the rim than if the cover flange extends downward and inward, yet which permits the cover to be readily removed.

4th. The provision of means preventing buckling of the outer shell at the bottom of the vessel under heat.

In the drawing, I have illustrated one embodiment of my invention, though it is to be understood that the principle of the invention may be applied to a large number of other cooking utensils and that the principle is not limited to cooking vessels, as it may be also applied to vessels used for keeping food cool or hot.

In the drawing:—

Figure 1 is a vertical sectional view of a utensil constructed in accordance with my invention;

Figure 2 is an enlarged vertical section of the rim of the vessel, showing the manner in which it is reinforced;

Figure 3 is a plan view of the annular spring;

Figure 4 is an enlarged fragmentary vertical section of the bottom of the vessel, showing a modified reinforcement therefor.

Referring to this drawing, it will be seen that my improved vessel comprises an outer shell, designated 10, and an inner shell 11. This inner shell for a distance approximately equal to half the depth of the vessel from its top to its bottom is in contact with the outer shell and secured thereto, but about half way down the side wall of the vessel the inner shell is inwardly deflected, as at 12, forming a shoulder, and then extends downward in spaced relation to the outer shell and across the bottom so as to form an air space 13 between the inner and outer shells, this air space being disposed below the bottom of the inner shell and half way up the sides of the inner shell. The outer shell 10 at its bottom may be reinforced by a transversely extending plate 14 of relatively heavy metal spaced from the bottom of the inner shell to form an air space 14ª, as shown in Figure 4 and in the prior application for patent before referred to, and at the center of this bottom there are formed vent openings 15 extending both through the reinforcing plate and the outer shell and constituting a vent opening for the air space 13.

While I may use the construction shown in Figure 4, which, as before remarked, is the construction illustrated in the prior application above referred to, on small vessels, I preferably use the construction shown in Figure 1, wherein the outer shell 10 at the bottom is corrugated, as at 19, to thereby strengthen the bottom at this point and this outer shell at its middle is held away from the inner shell by an annular coil of stiff wire, designated 20 (see Figure 3). This is disposed so as to seat against the inner corrugation 19 and to bear against the bottom of the inner shell 11 and thus prevent the lower shell or bottom shell from crowning upward to such an extent as to impede the free motion of the air between the two shells and under some circumstances where too great a degree of heat has been applied to the vessel, crowning up so much as to bear against the inner shell and close off the vent 15.

The side walls of the vessel extend upward and outward to a point somewhat below the upper rim of the vessel, but from this point upward the inner and outer walls of the vessel extend outward at an angle slightly less than the lower portion of the side wall. The inner wall at the upper portion is reinforced by a reinforcing member 17 which is outwardly flanged at its top and the inner wall is carried over the flange of this reinforcing member and over the rim flange of the outer wall 10, as at 18. I do not wish to be limited, however, to any particular manner of connecting the outer wall to the inner wall or reinforcing this part of the vessel, as any construction may be used for this purpose such as is illustrated in the application heretofore referred to.

The cover 19 extends outward to an amount equal to the depth of the rim of the vessel, then extends inward and downward, as at 20, and the downwardly extending portion 20 is downwardly and outwardly flared slightly and contacts with the slighly upward flaring portion 16 of the rim along the lower margin of the portion 20. As the cover is forced downward, this outwardly flaring flange 20 is forced inward, but at no time is the cover intended to be forced home, but only to be forced in as the resiliency of this flange 17 grows weaker, which will not occur, I have found in actual practice, for a very long time.

Riveted or otherwise attached to the cover is the handle 21, which may be of any usual or suitable form, and the cover is provided with a vent opening 22 over which is disposed a pivoted valve 23 having an upwardly projecting lug whereby the valve may be shifted to its open or closed position. The only purpose of this valve is to permit the cook to decide whether or not the heat within the vessel is sufficient for cooking the food. If the heat is too great, then the fire is to be turned down and, of course, if the heat is too low the fire is to be turned up. It will also permit the escape of steam which may be generated from the food, but ordinarily and in the great majority of cases this valve is turned so as to close the vent.

The vessel is provided at opposite points on its side walls with handles 24, these handles having shoulders 25 which engage against the outer wall and being overturned at their inner ends, as at 26, so that the inner ends of these handles practically constitute rivets holding the two thicknesses of metal constituted by the inner and outer walls firmly together, thus securing a relatively strong supporting base for the handles themselves and at the same time the rivets constituted by the handles hold the walls of the outer and inner shells in tight contact with each other to stiffen the structure.

It is to be understood that in this vessel food is not cooked by steam and food is not intended to be steamed when cooking in this vessel. Steam pressure cookers cook in a miniature steam boiler with a steam pressure of from five to thirty pounds. In the use of my improved vessel, however, there is not sufficient pressure ever generated to lift the cover off the vessel. Hot vapor is generated from the food before the boiling point is reached but this hot vapor is kept in and not let out into the outer air. This vapor is approximately at about 180° to 190° F. If the temperature is raised beneath the vessel to a degree that the contents boil, the steam generated will raise the cover at once, but this does not secure any better cooking and experience for a number of years with vessels constructed with a dead air space, as disclosed in the application heretofore described, and in this present application secure the best cooking with a scalding vapor at a less temperature than 212°. Thus many vegetables and fruits can be cooked without breaking up or destroying the natural fruit colors or the structure.

It might at first seem that as between a vessel having a dead air space extending across the bottom and up to the upper edge of the vessel and a vessel having an air space which extends across the bottom and only half way up the sides of the vessel, the advantage would be in favor of the vessel having the greatest air space, that is one extending the highest, but actual experiment has shown me that this is not the case. A vessel having the air jacket extending about half way up and with a vent in the bottom will cook food quicker than a vessel having an air space extending up to the top. In the first case, the heated air passes out of the upper vent and there is no circulation established of the heated air. Therefore, more heat is required to operate the former than the latter.

In constructing a vessel having a jacket extending only half way up, the same amount of metal is used but with the shorter air jacket and the circulation of heated air established with a vent only at the bottom where the coolest air is ejected by air pressure, the air jacket is kept hotter with the same amount of heat. Furthermore, the double metal sides above the air jacket act as very ready conductors of heat to such an extent that the upper portion of the vessel, with an air jacket extending only half way up, is hotter with the same heat than in the case of a vessel with the air jacket extending to the top, where there is no return of the heated air but an ejection of it into the atmosphere. Thus I have found that a vessel with a jacket extending half way up with a vent in the bottom can be maintained at a cooking temperature when that temperature is reached with less gas or electricity or with other form of heating means than can a vessel with the air jacket extending all the way up and a vent at the top. This economy of heat is a very important matter, particularly in those portions of the country where the gas is artificial and relatively costly.

Where the air jacket extends to the top of the vessel and there is an air vent at the top of the vessel, the heated air is passed from beneath the bottom of the vessel upward and outward into the outer air, the space or jacket being simply in the nature of a shield or fence holding the warm air in as closely as possible to the inner vessel, but if the air vent or port at the upper edge is closed, I have found by experiment, and a port opened in the bottom, the heating of the vessel is improved, for then a circulation of heated air is established and the expanded air which would create a pressure were there no vent is allowed to escape at the bottom vent, this air being crowded down from the upper portion of the jacket by the hotter air continually rising from the heated surface. Thus this bottom vent allows that escape and establishes a circulation of heated air within the jacket and thus less heat is required to accomplish a given result. Such a vessel has a heating surface over the entire bottom and all the surface of the inner sides of the vessel as against a heating surface of the ordinary vessel on the stove which is limited to the heating surface of the vessel immediately over the fire, the rest of the vessel being heated by induction or conduction. With my jacketed vessel, however, having a vent in the bottom, the air is heated first to the very top of the jacket and all around the sides and the bottom, the bottom of the vessel immediately over the vent being theoretically the coolest part of the entire vessel.

It is not a matter of economical construction to have the air space extend only half way up the vessel instead of all the way up, as the same amount of metal is used and there is often a slightly greater amount of labor involved.

Comparing two vessels, one with the air jacket all the way up and the other with the air jacket extending partially, say one-half way up, and each having a vent in the bottom, the heated air rises to the top of the jacket and being forced down and out by other higher heated air requires a longer time to make the circuit and cool more in making the circuit than in the case of the jacket extending only half way up. The circuit in the vessel having the half jacket being shorter, the return is made quicker and the resulting heat is greater with the same amount of heat applied. Furthermore, the conduction of the heat from the upper part of the jacket, where the jacket extends half way up the vessel, is very rapid, as there are two thicknesses of metal and a small amount of heated air is admitted between the two thicknesses of metal and ascends between the plates or thicknesses, aiding rapid conduction of the heat to the upper edge of the vessel so that such a vessel arrives at a cooking temperature sooner than a vessel with the space all the way up and with a less heat cost.

I intend my improved utensil to be used not only for cooking purposes but also for evaporating purposes, and I have found in actual practice that where it is used for evaporation as, for instance, an evaporating pan, evaporation will take place quicker and better results are accomplished. A vessel constructed in accordance with my invention is adaptable to syrup making, milk evaporating and a large number of other evaporating processes. The vessel is also particularly adapted for use in candy making because of the extreme gentleness of the cooking and the uniform heating which is secured. Where the vessel is used for evaporating, it would have exactly the same principle as the form described, except that the shape of the pan would be more suitable for evaporating purposes and instead of one vent, inasmuch as the pan would be relatively long and narrow, there would be a plurality of vents in the bottom.

The utensil is very convenient and very valuable in the cooking of jellies and preserves because of the fact that the double walls permit a steady, moderate heat to be maintained. Operated, as the utensil is, with a low flame or relatively small amount of heat, there is no danger of burning or scorching preserves or jellies, and because of the fact that there is a steady and uniform heat entirely around the utensil, there is no need of continual stirring.

It will be understood also that my utensils not only may be used for heating food or keeping food hot, but that they may be used for keeping food cold, cold food being placed within the vessel, the cover put on, and the heat being then prevented from rapid radiation by the insulating air jacket which surrounds the food. Here, again, I have found by actual test that a vessel having its jacket extending only half way up will act to insulate the contents of the vessel, be these contents hot or cold, much better than a vessel having an air jacket or space extending to the top of the vessel.

It is also to be understood that the vent in the cover or top of the vessel may be used to allow the escape of vapor when needed to reduce the liquid content. Thus if an article with water, such as dried beans or dried fruit, is being cooked and it seems there is too much water, instead of pouring it off and thus losing the valuable juices, if the valve to the vent be left open the cooking continues and the escaping vapor will reduce the water content without waste.

I claim:—

1. A vessel of the character described comprising an inner shell and an outer shell extending in approximately parallel spaced relation across the bottom of the vessel and approximately half way up the inner shell to provide an air chamber between the inner and outer shells, the outer shell at the top of the air chamber extending inward into approximate contact with the inner shell, then extending up to the top of the inner shell, and being engaged therewith at the rim of the vessel.

2. A vessel of the character described comprising an inner shell and an outer shell, the outer shell being spaced from the bottom of the vessel and from the sides thereof, said space extending approximately half way up the sides of the inner shell, the inner shell then extending outward into contact with the outer vessel and upward to the rim and having air-tight engagement with said rim, the outer shell being formed with a relatively small vent, and handles having stems extending through the walls of the outer and inner shells above the air chamber, thereby holding the walls of the outer and inner shells in tight contact.

3. A vessel of the character described comprising an inner shell and an outer shell, the inner shell being spaced from the outer shell across the entire bottom of the vessel and extending up its sides for a distance approximately half the height of the vessel, the inner shell at this point then extending outward into contact with the outer shell and then extending upward for the full height of the outer shell and being engaged therewith at the top of the vessel, the outward projection of the inner shell midway of the height of the vessel forming a shoulder upon which cooking utensils may be supported.

4. A vessel of the character described having a smooth face on its inner upper margin, and a cover for the vessel having an outwardly projecting rim and a downwardly and outwardly flaring resilient flange, the lower margin of which is adapted to engage with the smooth inner face of the upper margin of the vessel to thereby secure air-tight engagement between the two, the flange impinging against the inner smooth face in any position at an angle to this smooth face.

5. A vessel of the character described having the upper margin of its side wall slightly upwardly flaring relative to the vertical axis of the vessel, a cover having an outwardly projecting rim adapted to rest upon the top of the side wall, and a downwardly and outwardly flaring resilient flange, the margin of which is adapted to contact with the last named portion of the vessel.

6. A utensil of the character described having an inner shell and an outer shell, the inner and outer shells being spaced from each other at the bottom of the vessel and on the sides to thereby provide an air chamber surrounding the inner shell, the outer and inner shells having air-tight engagement with each other at the top of said air chamber, the bottom of the outer shell having a vent, and a spacing member disposed between the outer shell and the inner shell and approximately concentric to and relatively adjacent to the vertical axis of the vessel, said spacing member being of such form as to permit the circulation of air through the air chamber and through said vent.

7. A utensil of the character described having an inner shell and an outer shell, the inner and outer shells being spaced from each other at the bottom and on the sides to thereby form an air chamber surrounding the inner shell, the bottom of the outer shell having a vent, and a spacing member comprising an annular open coil of stiff wire disposed between the outer and inner shells and spacing the same apart and disposed concentric to the vent.

8. A utensil of the character described having an inner shell and an outer shell, the inner and outer shells being spaced from each other on the bottom and on the sides to thereby provide an air chamber surrounding the inner shell, the shells having air-tight engagement with each other at the top of said air chamber, the bottom of the outer shell approximately at the center thereof having a vent, and a spacing member disposed between the outer shell and the inner shell approximately concentric to the vent and the vertical axis of the vessel and relatively adjacent said vertical axis, said spacing member being formed to permit circulation of air between that portion of the air chamber surrounded by the spacing member and the portion of the air chamber exterior to the spacing member.

9. A vessel of the character described comprising an inner shell and an outer shell, the outer shell being spaced from the inner shell across the bottom of the inner shell and up the sides of the inner shell and having air-tight permanent engagement with the inner shell at the top of the air space thus formed, the outer shell being formed with a vent opening on a level below the bottom of the inner shell.

In testimony whereof I affix my signature.

WILLIAM J. SANBORN.